UNITED STATES PATENT OFFICE.

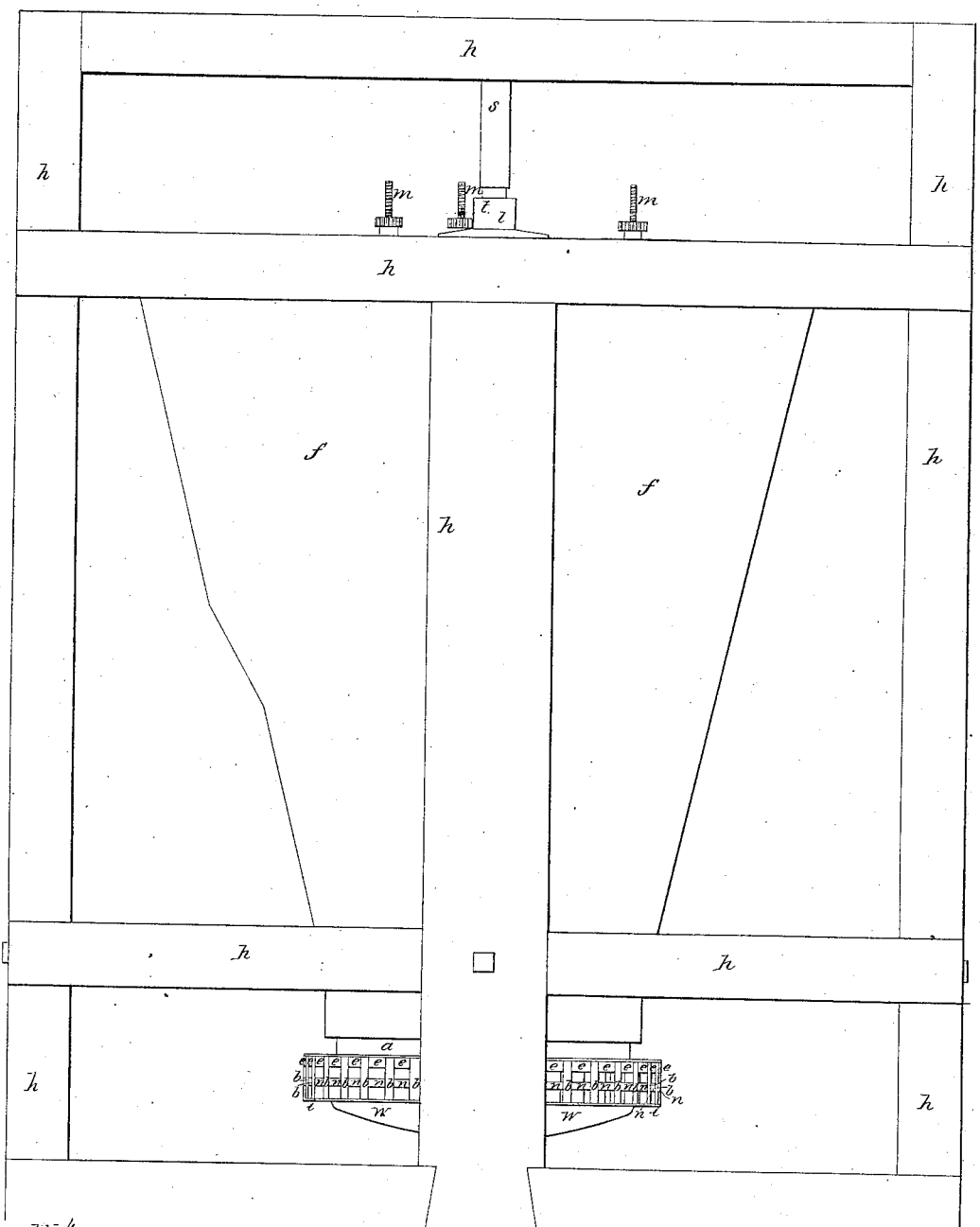

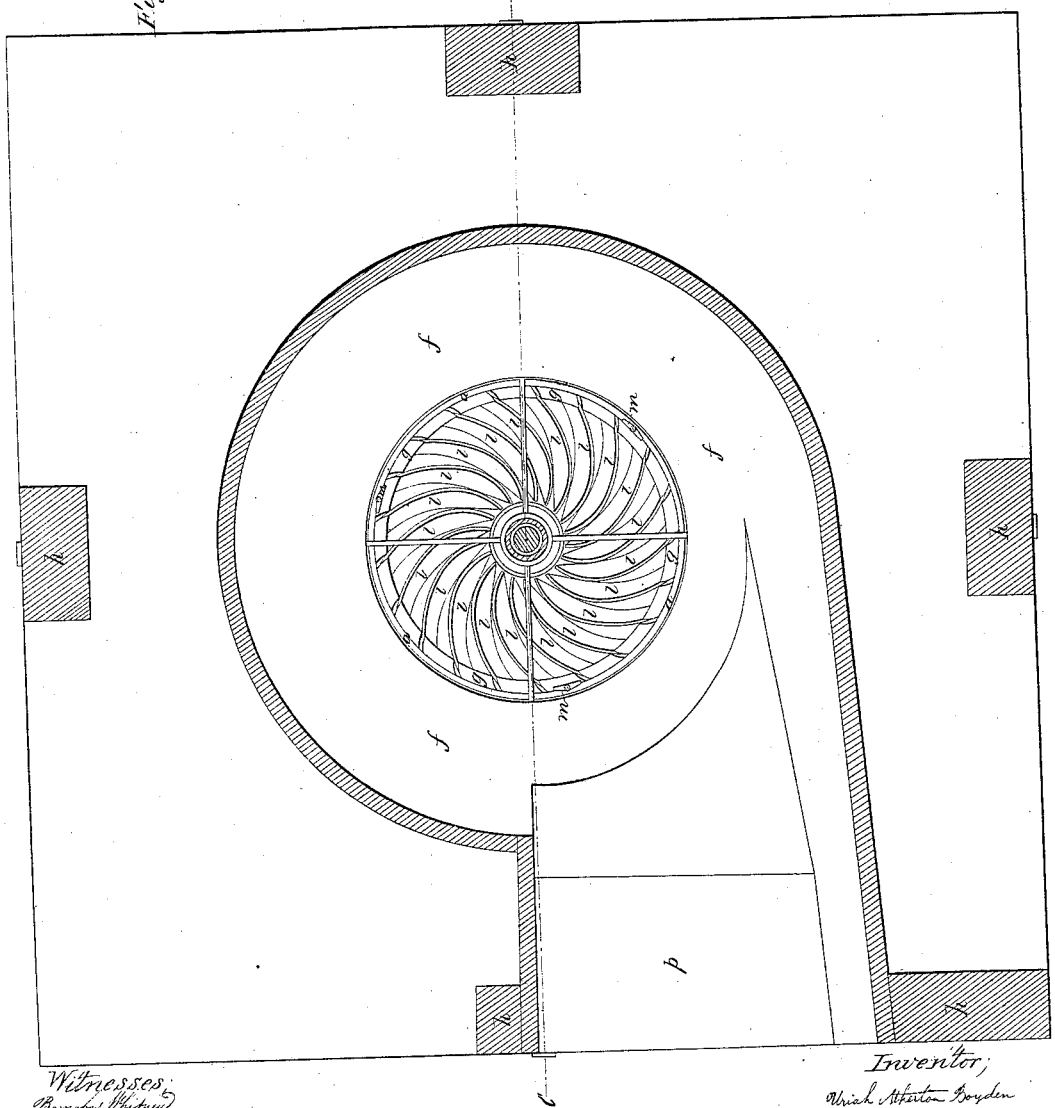

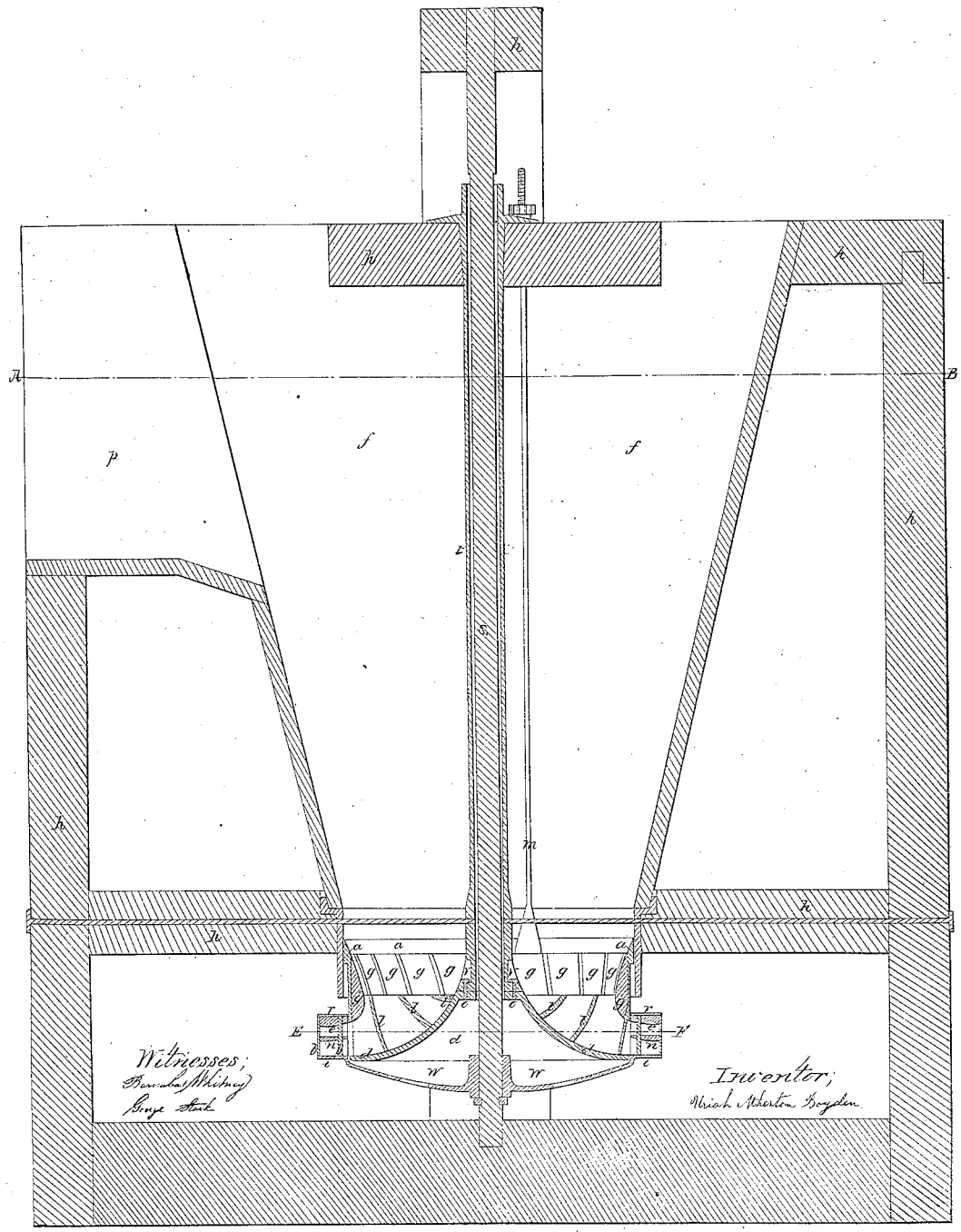

URIAH ATHERTON BOYDEN, OF BOSTON, MASSACHUSETTS.

IMPROVEMENT IN TURBINES.

Specification forming part of Letters Patent No. 10,025, dated September 20, 1853.

*To all whom it may concern:*

Be it known that I, URIAH ATHERTON BOYDEN, of Boston, in the county of Suffolk and State of Massachusetts, have invented new and useful Improvements in Turbines, whereby the efficiency of water in actuating them is increased and the cost of constructing them diminished; and I do hereby declare that the following is a full and exact description thereof.

My invention consists, first, in leaning or inclining the leading curves or guides, which direct the water into the wheel, whereby the water is made to move in the proper directions when it enters the wheel with less loss of its force than there is in turbines as usually made; secondly, in forming the garniture or the annular gate, or both, so that the change in the direction of the water in passing them may be more gradual than with those in common use, and so that the part of the water which passes in contact with or near the garniture or gate moves in directions inclining to the plane of the wheel when it passes from the gate into the wheel, and in forming that part of the upper side of each passage for the water through the wheel, which is next the annular gate, inclining to the plane of the wheel, a part of each being curved, so as to increase the force of the water on the central parts of the floats or buckets or on their parts near their centers, and it includes curving the upper surface of the circumferential part of the disk upward a little toward the inner edge of the lower rim of the wheel and curving the upper surface of the lower rim of the wheel a little or forming the lower sides of the passages into and through the wheel, so as to diminish the height of the passage or passages from the garniture to about three-fifths of the way from the inner to the outer edges of the rims of the wheel; thirdly, in a new method of fastening the disk to the pipe which supports it.

To enable others skilled in the art to make and use my invention, I will proceed to describe its construction and operation by explaining the annexed drawings, which make a part of this specification.

Figure 1 is an elevation of the turbine, the penstock, the flume, and the frame which supports them. Fig. 2 is a horizontal section hrough so near the top of the flume as to how the greater part in plan. Fig. 3 is a vertical section through the axis of the turbine and its flume and the frame which supports them. Fig. 4 is a horizontal section of the disk, leading curves or guides, wheel, and shaft; and Fig. 5 is an elevation of the disk and leading curves or guides.

The same small letters in all the figures refer to the same parts.

$h\ h$, &c., is the frame which sustains the penstock, flume, and turbine.

$p$ is the penstock.

$f\ f$ is the flume.

The turbine consists of the disk $d\ d\ d$, the leading curves or guides $l\ l$, &c., the annular gate $a\ a\ a\ a$, the three rods $m\ m\ m$ for moving the gate, the garniture or lining $g\ g$, &c., of the gate $a\ a\ a\ a$, the tube $t\ t$, the water-wheel $w\ w$, including its lower ring or rim $i\ i$, its upper ring or rim $r\ r$ and its floats or buckets, $b\ b$, &c., and the shaft $s$, and the turbine usually has some appendages which it is not necessary to mention.

The turbine represented by these drawings has one diaphragm $n\ n$, &c.

The leading curves or guides $l\ l$, &c., are usually vertical when the wheel is horizontal, as it usually is—that is, they are parallel with the shaft of the wheel—and these curves are so made and placed that as the water moves horizontally or inclining to the horizon from the tube $t\ t$ to the floats $b\ b$, &c., the water has its direction changed by these curves, so as not to move directly from the shaft, but rather obliquely toward the floats the same way the wheel turns—that is, so that when the water passes between any two floats it moves nearly in the direction in which these floats move. This change of the direction of the water to the way in which the floats move is produced by the common vertical curves only in consequence of the horizontal motion of the water; but I, in addition to such curvature, make these curves lean or incline so that the water, in consequence of its downward motion, is also caused to move the way in which the floats it is to pass between move, and this is the first branch of my invention. This leaning or inclining of the leading curves is shown in Figs. 2, 3, and 4, and the leaning of their exterior ends is shown most palpably in the elevation, Fig. 5.

In the common flumes, in which the water does not acquire a helical or spiral motion before it passes between these curves, their outer ends next the wheel may lean about thirteen degrees—that is, they may make an angle with the plane of the wheel of about seventy-seven degrees; but when the flumes are made and united with the penstocks according to my improved method, which is shown by the drawings above described, in which the water acquires a helical or spiral motion in the flume before it reaches the leading curves, their ends next the wheel may lean about seventeen degrees.

If the parts of the leading curves which are nearest the tube $t\,t$ lean rather most, or the angle of the leaning of these parts be rather greatest, they will operate rather better than when each part makes the same angle with the plane of the wheel; but I have found rather more practical difficulty in fixing the outer ends of these guides correctly when their inner ends lean much than I have had when they lean less, so that the angles of leaning at different parts will be proportional to the distances of such parts from the axis of the turbine, and in cases where the water has not a helical motion before it passes between these guides they will answer very nearly as well as if their inner ends leaned most; but if the inner ends of these guides which are next the tube lean most and be of much less width or height than their outer ends the whole departure or separation of these ends from a perpendicular to the wheel may, because of their less width, be less than in some other parts. This leaning of the leading curves causes the water to move in the proper directions with less loss of its force by shocks, eddies, and friction than there is when they are vertical or perpendicular to the wheel. If the distance apart of the rims of the wheel next the gate—that is, the height of the entrance or entrances into the wheel—be more that one-eleventh of the diameter of the wheel, these curved guides should lean rather less than mentioned above, because their leaning diminishes the amount of the passages for the water downward between them, and they will be too small if they lean much and the height of the wheel be great without its diameter being proportionally great.

The common form of the garniture $g\,g$, &c., is such that the lowest part of its curve, which is nearest the disk, is horizontal, so that the water at the upper side of the streams, where it leaves the garniture or gate in passing to the floats, moves horizontally, and the upper surface of the circumferential part of the disk $d\,d\,d$ next the lower rim $i\,i$ is usually horizontal; and the common form of the rims $r\,r$ and $i\,i$, which hold the floats, is that of plane rings, so that both the upper and lower side of each passage through the wheel is parallel with the plane of the wheel and the width or height of each passage is the same at all places in the wheel, and as the horizontal widths of all the passages, measured on circles having the axis of the wheel for their centers, are at all distances from said axis proportional to the distances of such parts from said axis the areas of the sections of said passages increase in the same ratio as their distances from the axis of the wheel increase, excepting the deviation, caused by the floats occupying a part of the space between the rims of the wheel. When the water first strikes the floats, or passes into the space between the rims of the wheel in consequence of the directions given it by the guides, it moves quite obliquely the way the wheel turns, and if there be no shock produced by the water's striking the floats at their inner ends (which shocks cannot happen without loss of power) the first change in the direction of the water after it passes between the floats, is rather to the way the wheel turns, instead of its being deflected the opposite way, as it must be before it leaves the wheel to communicate near all its force to the wheel. The deflection of the water toward the way the wheel turns is produced, chiefly, in the portion of the wheel not very far from the gate, and it is caused by the space for the water increasing in too great a rate as its distance from the axis of the wheel increases, and it produces a loss of a part of the force of the water, which results from the irregularity of its motions produced by such form. No such change in the direction of the water occurs in simple reacting wheels, in which there is nothing to cause the water to move the way the wheel turns before it passes between the rims of the wheel. As the leading curves do not extend under the gate, the passage between the gate and disk in a turbine as commonly made is from this cause greater than the sum of the passages between the leading curves next the gate, besides the difference produced by the difference in the distance from the axis of the turbine. The passages between the leading curves being too small for the passage under the gate prevents the water from running as rapidly as it otherwise would when it first enters the space between the rims of the wheel, and prevents its acting on the wheel as forcibly as it otherwise would.

The second branch of my invention consists in partially avoiding these evils by causing the passages to diminish in height from the garniture to about three-fifths of the way from the inner to the outer edges of the rims of the wheel, so as to cause the streams to diminish in height as they expand in width, so that the water will lose little or none of its velocity in passing from the leading curves to the wheel, and so as to diminish the parts of the passages through the wheel which are too large as commonly made. To do this I form the garniture as shown at $g'\,g'$ in the section Fig. 3; the lowest extremity of its curve not being horizontal, but inclining to the plane of the wheel, and so is the lowest surface of the annular gate $a\,a\,a\,a$, so that the water at the upper parts of the streams, where it leaves the garniture or gate, tends downward, or converges to the other side of the stream. The angle which the last element of the curve makes with the plane of the wheel is about twenty-eight degrees—that is, the surface of the gate at any point nearest the disk makes an angle of about sixty-two degrees with the axis of the wheel—and I make the upper side of that part of each of the passages through the wheel which is near the gate descending or inclining to the plane of the wheel, the part nearest the gate having the same or very nearly the same inclination as the lower curved surface of the gate next it, and some part of each passage being curved, as shown at e e, Fig. 3, so that at about three-fifths of the distance from the inner to the outer edges of the rims of the wheel the height of the passages will be about as little as at any place, their height being near the same from this place to the outlets of the wheel; or if their heights increase toward the periphery of the wheel their least height should be at about one-third of the distance from the inner to the outer edges of the rims of the wheel, and the curve of the lower surface of the upper rim should extend to the inner edge of this rim. Hence when the gate is fully open the water at the upper parts of the streams moves rather downward from the garniture along the upper sides of the passages and gradually changes its direction, so as to move nearly or quite horizontally or nearly or quite parallel with the plane of the wheel at some place not very far from half-way from the inner to the outer edges of the rims of the wheel, the height of the passages at this place being about six-sevenths as great as at the inner edges of the rims of the wheel. If said inclined surface of the gate extends quite to the outside of the gate next the wheel, or if the said inclined surface of the disk extends quite to its periphery, there is rather more danger of this corner of the gate or the corner of the disk being injured, so that they will not fit each other so as to prevent leaking, than there is when the parts which touch each other are plane; but a very little width of plane surface is sufficient for this purpose, as one-sixteenth of an inch in width in a wheel six feet in diameter. This inclining of the upper side of the passage into the wheel causes the water to pass by the space between the gate and upper rim of the wheel at such an angle with it as to make the danger of some of the water being lost by its escaping through this space less than in turbines as they have heretofore been made, and a less diminution of the danger of losing some of the water by its passing down between the disk and lower rim of the wheel may be made by so causing the water at the lower side of the stream to ascend as it passes into the wheel.

Some turbine wheels have one or more diaphragms or partitions n n, &c., Figs. 1, 3, and 4, which are commonly of uniform thickness and plane and parallel with the wheel. The second branch of my invention applies to these diaphragms or partitions, as well as to the rims of the wheels, though if the diaphragms be of the same thickness in all their parts their lower surfaces should not be of exactly the same form as the lower surfaces of the upper rims of wheels described above, because if one were of the same form and near the lower rim of the wheel the passage between it and the lower rim would be of too little height where least, and the distance between this diaphragm and the upper rim of the wheel or between two diaphragms would be the same throughout the space. Therefore they should be curved rather less than the lower surface of the upper rim or the lower surfaces of the pieces e e in such wheels as have these, so as to divide the space between the upper and lower rims or between the pieces e e, &c., in such wheels as have them, and the lower rim nearly proportionally at all places from the inner to the outer sides of this space, though the spaces next the lower rim of the wheel may contract in a rather greater ratio than the spaces next the upper rim, especially near the gate, because the lower surface of the upper rim or the lower surface of a diaphragm next the gate should have nearly the same direction as the lower curved surface of the gate next it to prevent a loss of much of the force of the water by an abrupt turn at this place; but if the edges of these diaphragms nearest the axis of the wheel be thinner than their other parts, as represented at n n, Fig. 3, the lower surface of the upper rim or the lower surfaces of the pieces e e, &c., in such wheels as have them should be rather nearer plane than if the wheel had no diaphragm which so varies in thickness; so that the sum of the contractions produced by the inclination of the lower surfaces of the pieces e e, &c., and that produced by the variation in the thickness of the diaphragm will not be much greater than when there is no such variation in the thickness of the diaphragm, and when the diaphragm so varies in thickness its lower surface and the lower surfaces of the pieces e e, &c., may be of nearly or exactly the same form.

A small diminution in the height of the passage may be produced by inclining the upper surface of the circumferential part of the disk d d d upward a little toward the lower rim of the wheel and inclining upward that part of the upper surface of the lower rim of the wheel next the disk, somewhat as above described for the lower surface of the upper rim or pieces e e, &c, though in a less degree. The part of the upper surface of the lower rim which is next the disk should have the same or very nearly the same inclination as the inclined upper surface of the disk next it, to prevent any abrupt change in the motion of the water in passing this part; but the inclination of this part of the disk and the upper surface of the lower rim next it should not be near as great as the inclination of the lower edge of the gate, because this would make the whole amount of the change of the direction of the motion of the water from downward to pass into the wheel greater than would be required to produce the same amount of contraction by inclining the upper side of the passage, as above described, and because this inclining of the lower surface of the garniture and gate tends to diminish the abrupt spreading of the streams in the wheel when the gate is only partially open; but the inclining upward of the lower sides of the passages into the wheel does not have this good effect; but because there is a loss of a very small part of the force of the water in its moving very obliquely to the plane of the wheel when it enters the wheel, and because the loss from this cause is rather less when this contraction is produced by the water at both the upper and lower sides of the stream inclining to the plane of the wheel. It may be as well to have about one-fourth of this contraction produced by the inclining upward of the upper surface of the disk next the wheel and the part of the upper surface of the lower rim next the disk, so that the lowest surface of the gate will make an angle of about sixty-nine degrees with the axis of the wheel, and the upper surface of the lower rim next the disk will make an angle of about eighty-three degrees with the axis of the wheel.

The disk $d\ d\ d$ is usually sustained by a tube $t\ t$, and they are usually connected together by irons, which occupy more room at this place than is used for this purpose by my arrangement represented in Fig. 3, and as there is more water-way wanted at this place than there can be had with a regular surface for the water to pass by the common occupation of this room for connection causes a a loss of a small part of the force of the water.

In some turbines the disk $d\ d\ d$ and the tube $t\ t$ are both composed of one piece of metal; but it is difficult making them so, excepting in very small turbines.

In setting up turbines, or by a little bending of some parts after they have been put in use, it sometimes happens that one side of the periphery of the disk is too high for the other, and as they are usually made there is no means of readily correcting this error.

The third branch of my invention consists in avoiding these inconveniences and diminishing the cost of making by fastening them together with screws, as described below. I form the tube $t\ t$ with a flange at its bottom, and I form the top of the disk $d\ d\ d$ so as to fit the bottom of the tube so formed into a flange, and fasten the disk to the tube by means of screws $o\ o$, &c., Fig. 3. The depression in the tube above the screws $o\ o$, &c., is filled by the part $v\ v$, so as to form a regular surface for the water to pass by; or I invert the screws $o\ o$, &c., and pass them through the upper part of the disk and screw them into the tube, in which case the part $v$ may be a part of the tube. A patent which is to be issued to me in September, A. D. 1853 from the Patent Office of the United States for improvements in turbines whereby the efficiency of water in actuating them is increased and their inconvenience in use diminished is to represent a pipe and disk so made and fastened together by screws passing through the disk and screwing into the tube, which are so represented in Fig. 3 of said intended patent. With the parts so formed the disk is readily leveled or tipped to adjust it to the plane of the wheel by loosening the screws, $o\ o$, &c., and placing a thin substance between the disk and pipe on either side, as may be required, and tightening the screws.

The wheels of turbines and generally horizontal, and the water generally descends to pass between the leading curves, as it must when in the position represented by these drawings; but all the improvements above described are quite applicable to turbines in which the wheels are inclined to the horizon, and also to those in which the leading curves are under the disk, in which latter the water ascends to pass between these curves.

What I claim as my invention is—

1. The leaning or inclining of the leading curves or guides to the plane of the wheel, as above described.

2. The making of the inside of the garniture or the part of the gate next the disk, or both, of such a curvature or form that the water at the upper part of the stream or streams where it leaves the garniture or gate will have a downward motion, or a direction inclining to the plane of the water-wheel, and making the upper sides of the passages for the water through the wheel descending or inclining to the plane of the wheel from the commencement of the passages next the gate to about half-way from the inner to the outer edge of the upper rim of the wheel, where they are nearly or quite horizontal or nearly or quite parallel with the plane of the wheel, the inclination of that part of the lower surface of the upper rim of the wheel which is next the gate being the same or nearly the same as that of the lower surface of the gate next said upper rim, and the change from inclining to horizontal being gradual, as by a curve, or making the upper surface of the disk next the lower rim of the wheel to incline up toward this rim and making the lower sides of the parts of the passages through the wheel which are next the disk ascending or inclining to the plane of the wheel, so that the stream or streams will gradually diminish in height at the entrance or entrances into the wheel, so that the water which passes in the upper parts of the stream or streams will converge toward that which passes in the lower parts of the stream or streams before striking the floats, and continuing this converging into the wheel to about one-half the distance from the inner to the outer edges of the rims of the wheel.

3. The forming of the lower part of the tube which sustains the disk and the forming of the top of the disk or that part of it next the tube, and fastening these parts together, as above described.

I have in sundry parts of this description and claim, for brevity, written of the turbine as having its common position, in which case the water descends to pass between the leading curves without alluding to its ever having any other position; but I do not limit either division of my claim to the case when it has the common position, but I extend my claim to the cases in which the wheel is vertical or inclined to the horizon and to the case when the water ascends to pass between the leading curves, nor do I limit either division of my claim exactly to the forms above described, but I extend my claim to all forms which are essentially the same.

URIAH ATHERTON BOYDEN.

Witnesses:
    BARNABAS WHITNEY,
    GEORGE STARK.